(12) United States Patent
Wu et al.

(10) Patent No.: US 11,444,705 B2
(45) Date of Patent: Sep. 13, 2022

(54) MOBILE TERMINAL TEST APPARATUS, MOBILE TERMINAL TEST SYSTEM, AND CONTROL METHOD FOR MOBILE TERMINAL TEST APPARATUS

(71) Applicant: ANRITSU CORPORATION, Kanagawa (JP)

(72) Inventors: Zhihui Wu, Kanagawa (JP); Reiji Omoto, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 48 days.

(21) Appl. No.: 17/226,632

(22) Filed: Apr. 9, 2021

(65) Prior Publication Data
US 2021/0328689 A1 Oct. 21, 2021

(30) Foreign Application Priority Data
Apr. 21, 2020 (JP) .............................. JP2020-075404

(51) Int. Cl.
| | |
|---|---|
| *H04B 17/00* | (2015.01) |
| *H04B 17/15* | (2015.01) |
| *H04W 24/06* | (2009.01) |
| *H04W 24/10* | (2009.01) |
| *H04W 72/04* | (2009.01) |

(52) U.S. Cl.
CPC ............ *H04B 17/15* (2015.01); *H04W 24/06* (2013.01); *H04W 24/10* (2013.01); *H04W 72/0446* (2013.01)

(58) Field of Classification Search
CPC .... H04B 17/15; H04B 17/23; H04B 17/0087; H04W 24/06; H04W 24/10; H04W 72/0446
See application file for complete search history.

(56) References Cited

U.S. PATENT DOCUMENTS

| | | | | |
|---|---|---|---|---|
| 2016/0277949 | A1* | 9/2016 | Wakasa | H04W 36/0016 |
| 2016/0286422 | A1* | 9/2016 | Samejima | H04B 17/0085 |
| 2018/0343575 | A1* | 11/2018 | Ogawa | H04L 5/00 |
| 2019/0037424 | A1* | 1/2019 | Shirasaki | H04L 5/001 |

FOREIGN PATENT DOCUMENTS

| | | |
|---|---|---|
| JP | 2002-215800 A | 8/2002 |
| JP | 2005-092259 A | 4/2005 |
| JP | 5670486 B2 | 2/2015 |

* cited by examiner

*Primary Examiner* — Hashim S Bhatti
(74) *Attorney, Agent, or Firm* — Pearne & Gordon LLP (57) ABSTRACT

Provided are a mobile terminal test apparatus, a mobile terminal test system, and a control method for a mobile terminal test apparatus, capable of displaying setting information for each signal forming a multiplexed signal on one screen. A part of setting information set in the pseudo base station unit for each of signals forming the multiplexed signal is displayed as first setting information on the display unit, and when one of the signals forming the multiplexed signal is selected in a specific mode by the operation unit, setting information, other than the first setting information, set in the pseudo base station unit for the signal selected by the operation unit is displayed on the display unit, as second setting information such that the second setting information is superimposed on the first setting information.

7 Claims, 6 Drawing Sheets

FIG. 1

| DCI Detail Setting | | | | | | | | | | | | | | | | | | | | |
|---|---|---|---|---|---|---|---|---|---|---|---|---|---|---|---|---|---|---|---|---|
| Slot No. | 0 | 1 | 2 | 3 | 4 | 5 | 6 | 7 | 8 | 9 | 10 | 11 | 12 | 13 | 14 | 15 | 16 | 17 | 18 | 19 |
| Slot Type | D | D | D | D | D | D | D | D | D | S | U | U | U | U | U | U | U | U | U | U |
| Format | | | | | | | | | | 3 | | | | | | | | | | |
| Channel | SCH | SCH | SCH | SCH | SCH | SCH | SCH | SCH | SCH | SCH/CCH | SCH | SCH | SCH | SCH | – | – | – | – | – | – |
| DL DCI | ON | ON | ON | ON | ON | ON | ON | ON | ON | ON | – | – | – | – | – | – | – | – | – | – |
| K1 | 2 | 2 | 2 | 2 | 2 | 2 | 2 | 2 | 2 | 2 | – | – | – | – | – | – | – | – | – | – |
| DL S | 2 | 2 | 2 | 2 | 2 | 2 | 2 | 2 | 2 | 2 | – | – | – | – | – | – | – | – | – | – |
| DL L | 12 | 12 | 12 | 12 | 12 | 12 | 12 | 12 | 12 | 12 | – | – | – | – | – | – | – | – | – | – |
| UL DCI | ON | ON | ON | ON | ON | ON | ON | ON | ON | ON | – | – | – | – | – | – | – | – | – | – |
| K2 | 4 | 4 | 4 | 4 | 4 | 4 | 4 | 4 | 4 | 4 | – | – | – | – | – | – | – | – | – | – |
| UL Type | – | – | – | – | – | – | – | – | – | – | A | A | A | A | – | – | – | – | – | – |
| UL S | – | – | – | – | – | – | – | – | – | – | 0 | 0 | 0 | 0 | – | – | – | – | – | – |
| UL L | – | – | – | – | – | – | – | – | – | – | 14 | 14 | 14 | 14 | – | – | – | – | – | – |

Cancel   OK

MOBILE TERMINAL TEST APPARATUS, MOBILE TERMINAL TEST SYSTEM, AND CONTROL METHOD FOR MOBILE TERMINAL TEST APPARATUS

TECHNICAL FIELD

The present invention relates to a mobile terminal test apparatus, a mobile terminal test system, and a control method for a mobile terminal test apparatus.

BACKGROUND ART

As a mobile terminal test apparatus in the related art, for example, Patent Document 1 has proposed an apparatus which generates an allocation status display screen showing the correspondence between a physical channel, a time slot, a channelization code for each connection state, based on setting information of allocation acquired and specified by a setting information acquisition unit.

RELATED ART DOCUMENT

Patent Document

[Patent Document 1] Japanese Patent No. 5670486

DISCLOSURE OF THE INVENTION

Problem that the Invention is to Solve

However, the above-described mobile terminal test apparatus in the related art has a problem that the setting information for each time slot cannot be displayed on one screen when the setting information for each time slot increases.

The present invention has been made to solve such a problem, and an object is to provide a mobile terminal test apparatus, a mobile terminal test system, and a control method for a mobile terminal test apparatus, capable of displaying setting information for each signal forming a multiplexed signal on one screen.

Means for Solving the Problem

A mobile terminal test apparatus of the present invention is a mobile terminal test apparatus which tests a mobile terminal (2), including: a pseudo base station unit (10) that functions as a base station for the mobile terminal; a test control unit (13) that controls the pseudo base station unit; a display unit (14) that displays setting information in the pseudo base station unit; and an operation unit (15), in which the pseudo base station unit transmits and receives a multiplexed signal to and from the mobile terminal, and the test control unit displays, on the display unit, a part of setting information set in the pseudo base station unit for each of signals forming the multiplexed signal, as first setting information, and when one of the signals forming the multiplexed signal is selected in a specific mode by the operation unit, displays, on the display unit, setting information, other than the first setting information, set in the pseudo base station unit for the signal forming the multiplexed signal selected by the operation unit, as second setting information such that the second setting information is superimposed on the first setting information.

With this configuration, the mobile terminal test apparatus of the present invention displays, on the display unit, first setting information for each signal forming the multiplexed signal, and when one signal forming the multiplexed signal is selected, displays, on the display unit, second setting information other than the first setting information so as to be superimposed on the first setting information, so that setting information for each signal forming the multiplexed signal can be displayed on one screen even when there is a large amount of setting information for each signal forming the multiplexed signal.

In the mobile terminal test apparatus of the present invention, the multiplexed signal may be a signal in which the signals forming the multiplexed signal are time-division-multiplexed into a plurality of slots, and the test control unit may display, on the display unit, a part of setting information set in the pseudo base station unit for each of the slots, as the first setting information, and display, on the display unit, setting information, other than the first setting information, set in the pseudo base station unit for each of the slots, as the second setting information.

With this configuration, the mobile terminal test apparatus of the present invention can display setting information for each slot on one screen, even when there is a large amount of setting information for each slot.

Further, in the mobile terminal test apparatus of the present invention, when one of the signals forming the multiplexed signal is selected in a predetermined mode, which is different from the specific mode, by the operation unit, the test control unit may display, on the display unit, a setting change screen in which the second setting information set in the pseudo base station unit for the signal forming the multiplexed signal selected by the operation unit is adapted to be changed.

With this configuration, the mobile terminal test apparatus of the present invention can change the second setting information while displaying the first setting information for each slot on the display unit.

A mobile terminal test system of the present invention is a mobile terminal test system including: a mobile terminal test apparatus which tests a mobile terminal (2); and a test control apparatus (4) which controls the mobile terminal test apparatus, in which the mobile terminal test apparatus includes a pseudo base station unit (10) that functions as a base station for the mobile terminal, the test control apparatus includes a test control unit (13) that controls the pseudo base station unit, a display unit (14) that displays setting information in the pseudo base station unit, and an operation unit (15), the pseudo base station unit transmits and receives a multiplexed signal to and from the mobile terminal, and the test control unit displays, on the display unit, a part of setting information set in the pseudo base station unit for each of signals forming the multiplexed signal, as first setting information, and when one of the signals forming the multiplexed signal is selected in a specific mode by the operation unit, displays, on the display unit, setting information, other than the first setting information, set in the pseudo base station unit for the signal forming the multiplexed signal selected by the operation unit, as second setting information such that the second setting information is superimposed on the first setting information.

With this configuration, the mobile terminal test system of the present invention displays, on the display unit, first setting information for each signal forming the multiplexed signal, and when one signal forming the multiplexed signal is selected, displays, on the display unit, second setting information other than the first setting information so as to be superimposed on the first setting information, so that setting information for each signal forming the multiplexed signal can be displayed on one screen even when there is a large amount of setting information for each signal forming the multiplexed signal.

A control method for a mobile terminal test apparatus of the present invention is a control method for a mobile terminal test apparatus (1) which includes a pseudo base station unit (10) that functions as a base station for a mobile terminal (2), a test control unit (13) that controls the pseudo base station unit, a display unit (14) that displays setting information in the pseudo base station unit, and an operation unit (15), the pseudo base station unit transmitting and receiving a multiplexed signal to and from the mobile terminal, the control method including: causing the test control unit to execute: a first display step of displaying, on the display unit, a part of setting information set in the pseudo base station unit for each of signals forming the multiplexed signal, as first setting information; and a second display step of, when one of the signals forming the multiplexed signal is selected in a specific mode by the operation unit, displaying, on the display unit, setting information, other than the first setting information, set in the pseudo base station unit for the signal forming the multiplexed signal selected by the operation unit, as second setting information such that the second setting information is superimposed on the first setting information.

Further, in the control method for a mobile terminal test apparatus of the present invention, the multiplexed signal is a signal in which the signals forming the multiplexed signal may be time-division-multiplexed into a plurality of slots, and in the first display step, a part of setting information set in the pseudo base station unit for each of the slots may be displayed as the first setting information, on the display unit, and in the second display step, setting information, other than the first setting information, set in the pseudo base station unit for each of the slots may be displayed as the second setting information, on the display unit.

Further, in the control method for a mobile terminal test apparatus of the present invention, when one of the signals forming the multiplexed signal is selected in a predetermined mode, which is different from the specific mode, by the operation unit, the test control unit may execute a step of displaying, on the display unit, a setting change screen in which the second setting information set in the pseudo base station unit for the signal forming the multiplexed signal selected by the operation unit.

As described above, in the control method for a mobile terminal test apparatus of the present invention, the mobile terminal test apparatus of the present invention displays, on the display unit, first setting information for each signal forming the multiplexed signal, and when one signal forming the multiplexed signal is selected, displays, on the display unit, second setting information other than the first setting information so as to be superimposed on the first setting information, so that setting information for each signal forming the multiplexed signal can be displayed on one screen even when there is a large amount of setting information for each signal forming the multiplexed signal.

Advantage of the Invention

According to the present invention, it is possible to provide a mobile terminal test apparatus, a mobile terminal test system, and a control method for a mobile terminal test apparatus, capable of displaying setting information for each signal forming a multiplexed signal on one screen.

BEST MODE FOR CARRYING OUT THE INVENTION

Hereinafter, embodiments of the present invention will be described with reference to the drawings. In the embodiment of the present invention, an example in which the mobile terminal test apparatus according to the present invention is applied to a mobile terminal test apparatus that tests a mobile terminal conforming to the standard specifications of 5th Generation New Radio (5G NR) which is a 5G wireless system will be described.

Figure 1:
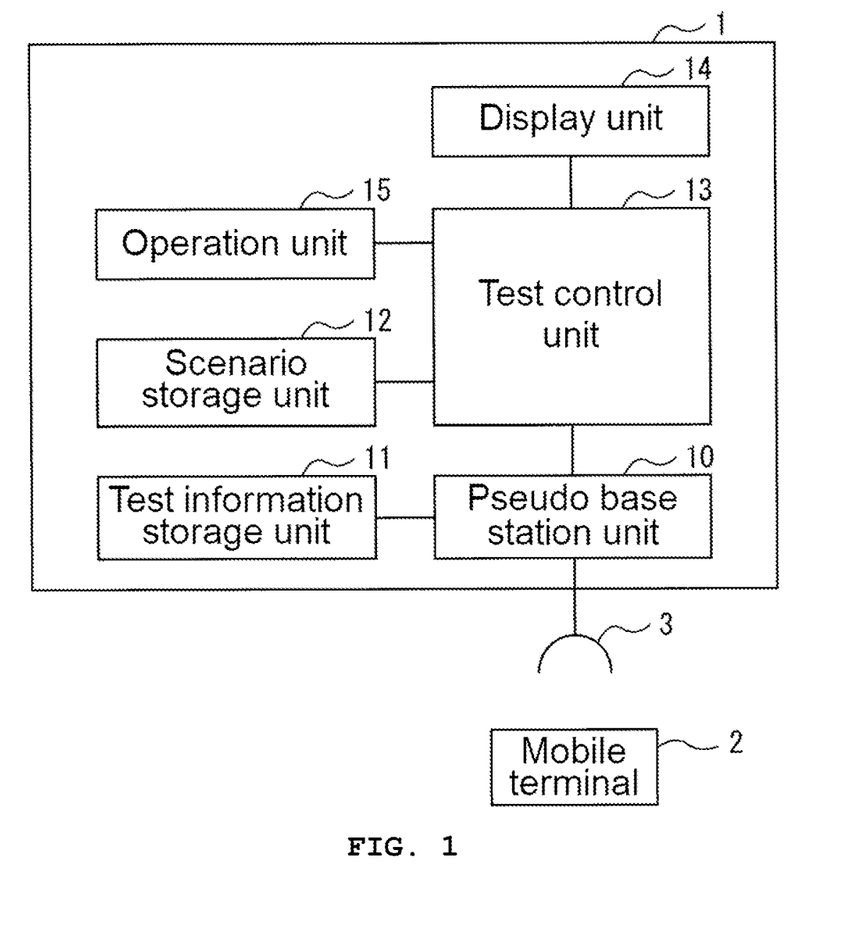
FIG. 1 is a block diagram of a mobile terminal test apparatus according to an embodiment of the present invention.

As shown in FIG. 1, a mobile terminal test apparatus transmits and receives signals to and from a mobile terminal 2 via an antenna 3. Further, the mobile terminal test apparatus 1 can transmit and receive signals to and from the mobile terminal 2 by wire via a coaxial cable or the like.

The mobile terminal test apparatus 1 is configured to include a pseudo base station unit 10 that functions as a base station of a mobile terminal, a test information storage unit 11 that stores test information including parameters for controlling the pseudo base station unit 10, a scenario storage unit 12 that stores information including a scenario for executing the test of the mobile terminal 2, a test control unit 13 that controls the pseudo base station unit 10, based on the information stored in the scenario storage unit 12, a display unit 14 that displays test results of the mobile terminal 2, and an operation unit 15 that receives a setting operation.

Here, the mobile terminal test apparatus 1 is composed of a computer apparatus (not shown) provided with a communication circuit for communicating with the mobile terminal 2. This computer apparatus includes a Central Processing Unit (CPU) (not shown), a Read Only Memory (ROM), a Random Access Memory (RAM), a hard disk apparatus, an input/output port, and a touch panel.

A program for making the computer apparatus function as the mobile terminal test apparatus 1 is stored in the ROM and the hard disk device of the computer apparatus. That is, when the CPU executes the program stored in the ROM, with the RAM as the work area, the computer apparatus functions as the mobile terminal test apparatus 1.

The pseudo base station unit 10 includes a CPU and a communication circuit. The test information storage unit and the scenario storage unit 12 include a RAM or a hard disk device. The test control unit 13 includes a CPU.

The display unit 14 is composed of a liquid crystal display device that constitutes a touch panel. The operation unit 15 is configured to include a pointing device such as a mouse or a tracking ball, a keyboard device, and the like, in addition to a touch pad constituting the touch panel. The operation unit 15 receives operations on the test control unit 13, such as test selection, test execution instruction, setting of test setting information, and adjustment of test result display.

In 5G NR, a mobile terminal and a base station transmit and receive signals by using a resource block consisting of a combination of one subframe which is 1/10 of a radio frame and 12 consecutive subcarriers as a transmission unit. Further, in 5G NR, one subframe is composed of one or more slots, and one slot is composed of 14 symbols.

A multiplexed signal in which a plurality of signals are multiplexed is transmitted and received between the mobile terminal 2 and the pseudo base station unit 10. Specifically, a multiplexed signal in which a plurality of signals are multiplexed into a plurality of slots by time division multiplexing is transmitted and received between the mobile terminal 2 and the pseudo base station unit 10.

Figure 2:
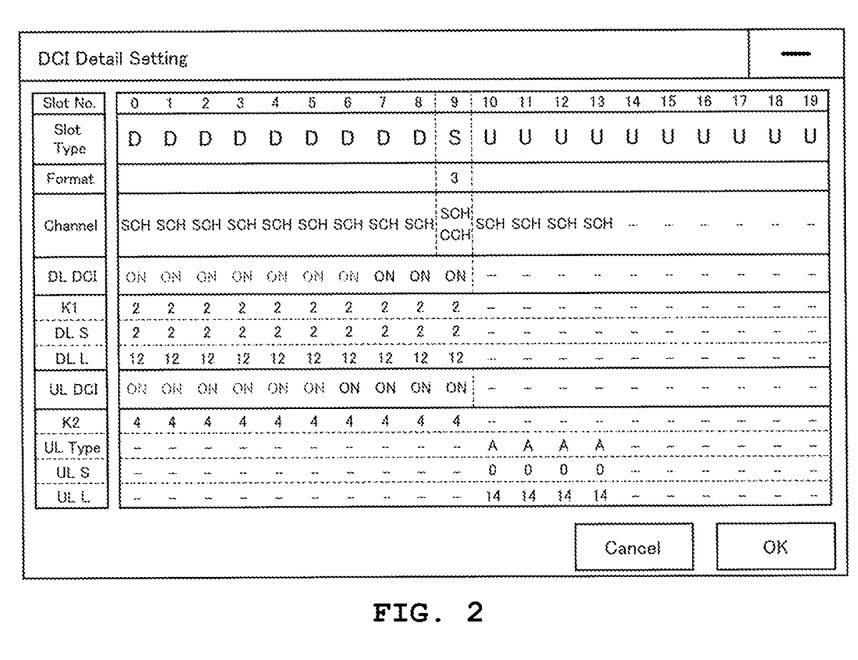
FIG. 2 is a diagram showing a display example of a first setting display screen displayed by the mobile terminal test apparatus according to the embodiment of the present invention.

As shown in FIG. 2, the test control unit 13 displays, on the display unit 14, a first setting display screen representing the setting information set in the pseudo base station unit 10 for each slot. On the first setting display screen, first setting information which is a part of the setting information set in the pseudo base station unit 10 for each slot is displayed.

The first setting information includes "Slot No", "Slot Type", "Format", "Channel", "DL DCI", "K1", "DL S", "DL L", "UL DCI", "K2", "UL Type", "UL S" and "UL L".

"Slot No" indicates a slot number. "Slot Type" indicates whether the slot is assigned to an uplink signal, a downlink signal, or a special link signal.

In "Slot Type", "U" is displayed when the slot is assigned to the uplink signal, "D" is displayed when the slot is assigned to the downlink signal, and "S" is displayed when the slot is assigned to the special link signal.

"Format" indicates the format number of the special link signal defined by Third Generation Partnership Project (3GPP). "Channel" indicates whether each channel corresponding to the slot is a data channel or a control channel.

In "Channel", the channel type of each slot is displayed. The display of "SCH" indicates a Shared Channel, and the display of "CCH" indicates a Control Channel. From the PHY layer perspective, the Shared Channel is PDSCH/PUSCH and the Control Channel is PDCCH/PUCCH.

"DL DCI" indicates whether or not to enable ACK/NACK of Physical Downlink Shared Channel (PDSCH). In "DL DCI", "ON" is displayed when ACK/NACK is valid. When there is no error in the setting of "K1", "DL DCI" is displayed in a normal mode (for example, "black" display), and when there is an error in the setting of "K1", "DL DCI" is displayed in an abnormal mode (for example, "red" display).

"K1" indicates the transmission timing of PDSCH ACK/NACK. For example, "2" is set in each of "K1" in slots #0 to #9. In slots #2 to #8 located two slots after slots #0 to #6, the "Slot Type" is "D" and ACK/NACK cannot be transmitted, so that "DL DCI" is displayed in an abnormal mode.

On the other hand, in slots #8 to #11 located two slots after slots #6 to #9, the "Slot Type" is "S" or "U", and ACK/NACK can be transmitted, so that "DL DCI" is displayed in a normal mode.

"DL S" indicates the start symbol of the downlink signal slot. "DL L" indicates the symbol length of the downlink signal slot. "UL DCI" indicates whether or not to enable the Physical Uplink Control Channel (PUCCH) scheduling information.

In "UL DCI", "ON" is displayed when the PUSCH scheduling information is valid. When there is no error in the setting of "K2", "UL DCI" is displayed in a normal mode (for example, "black" display), and when there is an error in the setting of "K2", "UL DCI" is displayed in an abnormal mode (for example, "red" display).

"K2" indicates the transmission timing of PUSCH. For example, "4" is set in each of "K1" in slots #0 to #9. In slots #4 to #9 located four slots after slots #0 to #5, the "Slot Type" is "D" or "S", and scheduling information cannot be transmitted, so that "DU DCI" is displayed in an abnormal mode.

On the other hand, in slots #10 to #13 located four slots after slots #6 to #9, the "Slot Type" is "U" and scheduling information can be transmitted, so that "DU DCI" is displayed in a normal mode.

"UL Type" indicates a Demodulation Reference Signal (DMRS) mapping type of an uplink signal defined by 3GPP. "UL S" indicates the start symbol of the uplink signal slot. "UL L" indicates the symbol length of the uplink signal slot.

Figure 3:
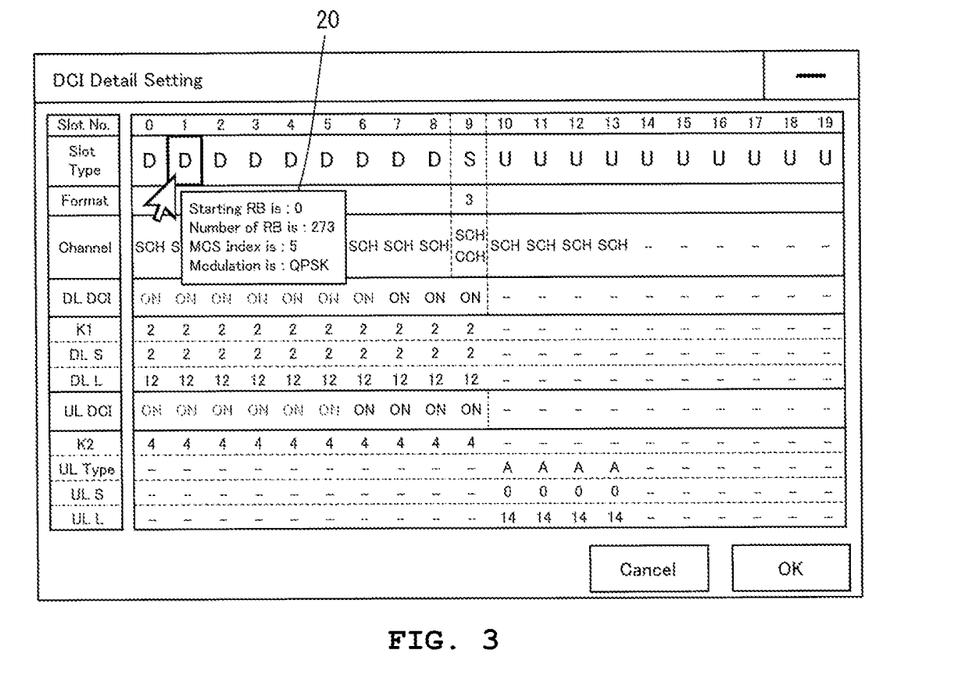
FIG. 3 is a diagram showing a display example of a second setting display screen displayed by the mobile terminal test apparatus according to the embodiment of the present invention.

As shown in FIG. 3, when one slot is selected in a specific mode by the operation unit 15, the test control unit 13 displays a second setting display screen 20 on the display unit 14 such that the second setting display screen 20 is superimposed on the first setting display screen.

On the first setting display screen, second setting information other than the first setting information among the setting information set in the pseudo base station unit 10 for each slot is displayed.

For example, when the cursor is placed in the "Slot Type" area of one slot by the pointing device constituting the operation unit 15, the test control unit 13 displays, on the display unit 14, the second setting display screen 20 for the slot.

On the other hand, when the cursor is moved out of the "Slot Type" area of the slot, for which the second setting display screen 20 is displayed on the display unit 14, by the pointing device constituting the operation unit 15, the test control unit 13 hides the second setting display screen 20.

Further, the "Slot Type" area of one slot is tapped by the touch pad constituting the operation unit 15, the test control unit 13 displays, on the display unit 14, the second setting display screen 20 for the slot. On the other hand, when the second setting display screen 20 is tapped by the touch pad constituting the operation unit 15, the test control unit 13 hides the second setting display screen 20.

As described above, the test control unit 13 may not select the "Slot Type" area, but may select an area of another information such as "Slot No" or a combined area of these areas.

The second setting information includes "Starting RB", "Number of RB", "MCS Index", and "Modulation". "Number of RB" indicates the number of resource blocks. "MCS Index" indicates an index of Modulation Coding Scheme (MCS).

The MCS index is uniquely associated with the combination of the modulation scheme and the code rate of the error correction code. "Modulation" indicates a modulation scheme. As described above, since the "MCS Index" is related to the modulation scheme, when one of the "MCS Index" and the "Modulation" is changed, it may be necessary to change the other.

Figure 4:
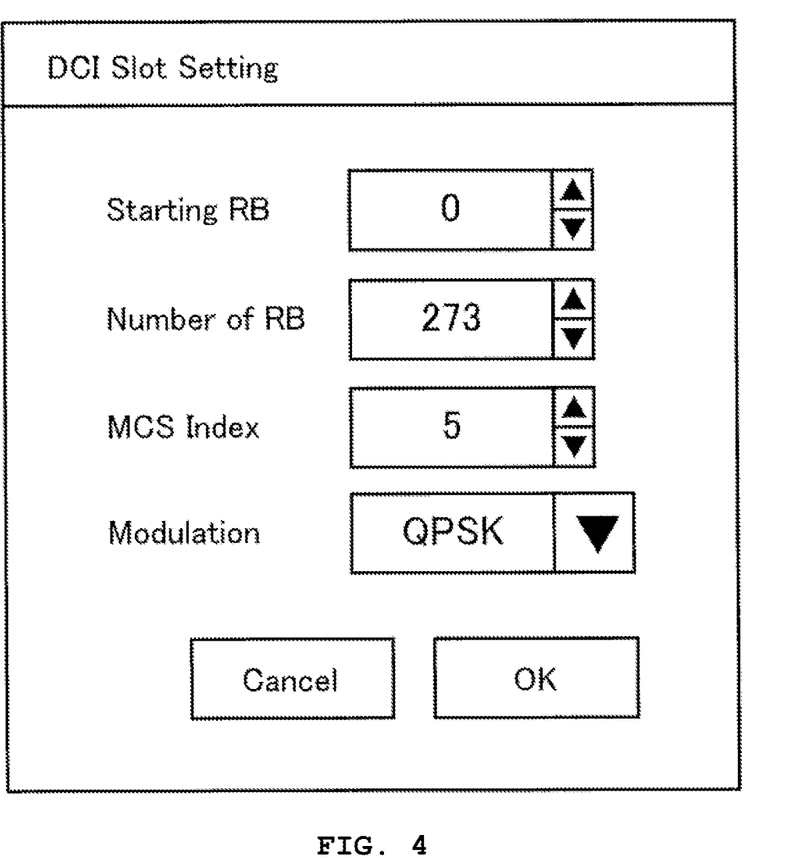
FIG. 4 is a diagram showing a display example of a setting change screen displayed by the mobile terminal test apparatus according to the embodiment of the present invention.

As shown in FIG. 4, when one slot is selected by the operation unit 15 in a predetermined mode, the test control unit 13 displays a setting change screen for the slot, on the display unit 14. The test control unit 13 enables the operation unit 15 to change the second setting information on the setting change screen.

For example, when the "Slot Type" area of one slot is clicked or double-clicked by the pointing device constituting the operation unit 15, the test control unit 13 displays the setting change screen for the slot, on the display unit 14.

Further, the "Slot Type" area of one slot is long-tapped or double-tapped by the touch pad constituting the operation unit 15, the test control unit 13 displays a setting change screen for the slot, on the display unit 14.

The setting information display operation of the mobile terminal test apparatus 1 according to the embodiment of the present invention configured as described above will be described with reference to FIG. 5. The setting information display operation described below is repeatedly executed from the request for displaying the first setting display screen to the closing of the first setting display screen.

Figure 5:
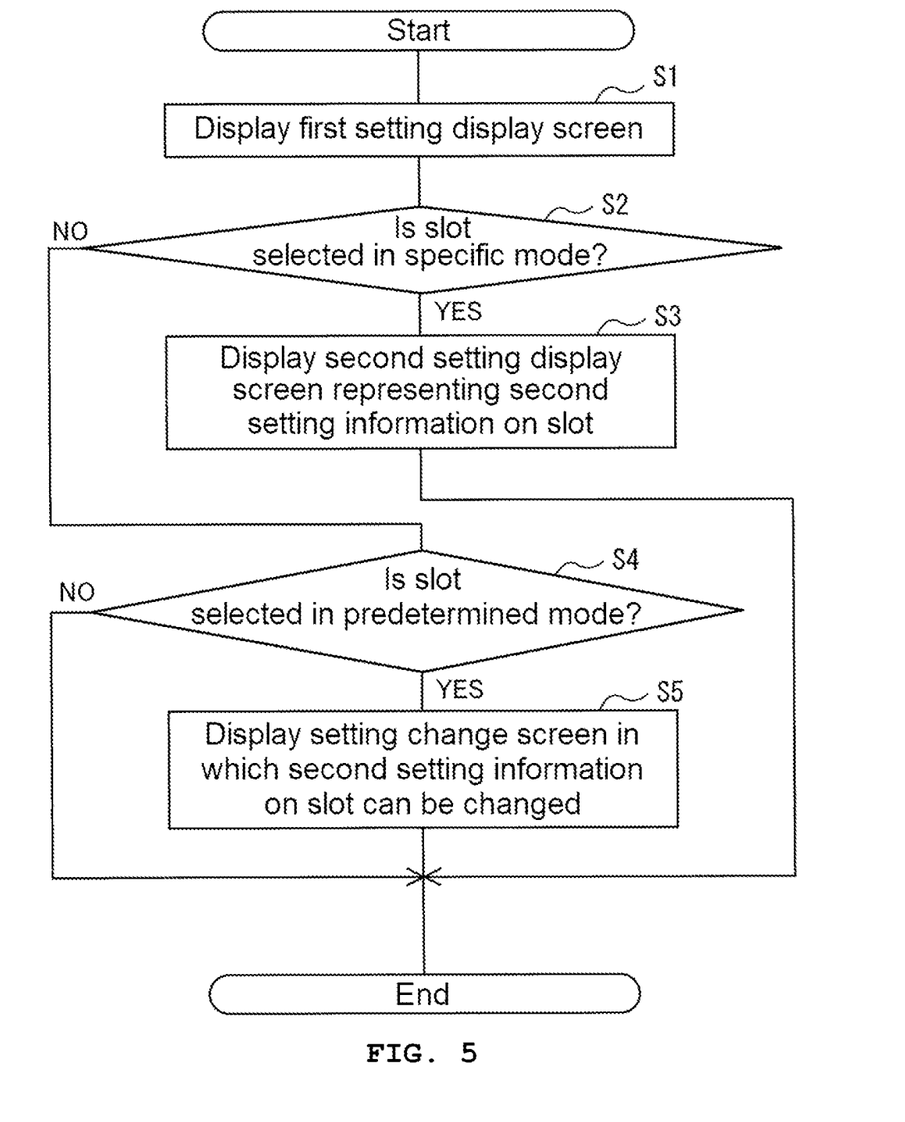
FIG. 5 is a flowchart showing a setting information display operation of the mobile terminal test apparatus according to the embodiment of the present invention.

First, the test control unit 13 displays the first setting display screen representing the first setting information, on the display unit 14 (step S1: first display step). Next, the test control unit 13 determines whether or not the slot has been selected in a specific mode (step S2).

When it is determined that the slot is selected in a specific mode, the test control unit 13 displays the second setting display screen 20 on the display unit 14 such that the second setting display screen 20 representing the second setting information on the slot is superimposed on the first setting display screen (step S3: second display step).

When it is determined that the slot is not selected in a specific mode, the test control unit 13 determines whether or not the slot is selected in a predetermined mode (step S4). When it is determined that the slot is selected in a predetermined mode, the test control unit 13 displays, on the display unit 14, a setting change screen in which the second setting information on the slot can be changed (step S5).

When it is determined in step S4 that the slot is not selected in a predetermined mode, or after the process of step S3 or S5 is executed, the test control unit 13 ends the setting information display operation.

As described above, in the present embodiment, first setting information for each slot is displayed on the display unit 14, and when one slot is selected in a specific mode, second setting information other than the first setting information is displayed on the display unit such that the second setting information is superimposed on the first setting information, so that setting information for each slot can be displayed on one screen even when there is a large amount of setting information for each slot.

Further, in the present embodiment, when one slot is selected in a predetermined mode, a setting change screen in which the second setting information can be changed is displayed, so that the second setting information can be changed while the first setting information for each slot is displayed on the display unit 14.

Further, the mobile terminal test apparatus 1 in the present embodiment may be configured to be connected to a general-purpose computer apparatus including a CPU, a RAM, a ROM, a flash memory, a hard disk device, and a communication module.

Figure 6:
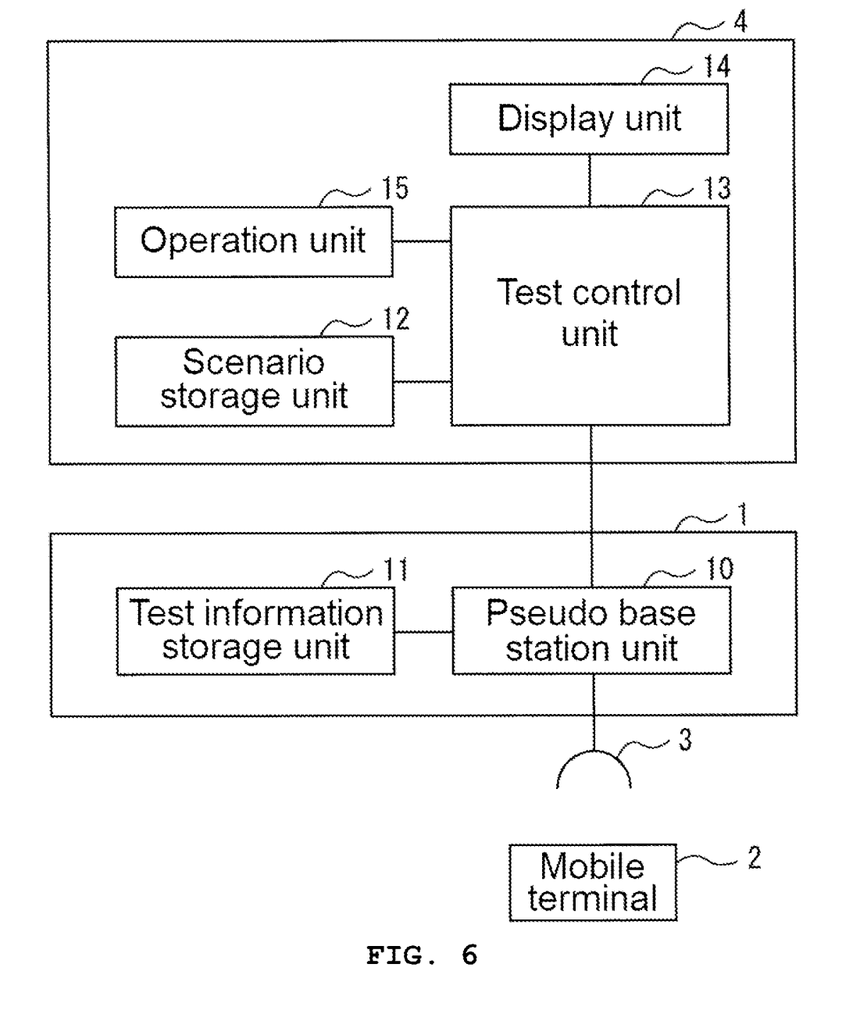
FIG. 6 is a block diagram of a mobile terminal test system according to a modification example of the embodiment of the present invention.

In this case, as shown in FIG. 6, the test control apparatus 4 including the scenario storage unit 12, the test control unit 13, the display unit 14, and the operation unit 15 is composed of a general-purpose computer apparatus, and the mobile terminal test system may be configured by the mobile terminal test apparatus 1 and the test control apparatus 4 excluding the scenario storage unit 12, the test control unit 13, the display unit 14, and the operation unit 15.

Although the embodiments of the present invention have been disclosed above, it is easy to make changes to the present embodiments without departing from the scope of the present invention. Embodiments of the present invention are disclosed on the premise that the equivalent with such modifications is included in the invention described in the claims.

DESCRIPTION OF REFERENCE NUMERALS AND SIGNS

1 Mobile terminal test apparatus
2 Mobile terminal
4 Test control apparatus
10 Pseudo base station unit
11 Test information storage unit
13 Test control unit
14 Display unit
15 Operation unit

What is claimed is:

1. A mobile terminal test apparatus which tests a mobile terminal, comprising:
   a pseudo base station unit that functions as a base station for the mobile terminal;
   a test control unit that controls the pseudo base station unit;
   a display unit that displays setting information in the pseudo base station unit; and
   an operation unit, wherein
   the pseudo base station unit transmits and receives a multiplexed signal to and from the mobile terminal, and
   the test control unit
      displays, on the display unit, a part of setting information set in the pseudo base station unit for each of signals forming the multiplexed signal, as first setting information, and
      when one of the signals forming the multiplexed signal is selected in a specific mode by the operation unit, displays, on the display unit, setting information, other than the first setting information, set in the pseudo base station unit for the signal forming the multiplexed signal selected by the operation unit, as second setting information such that the second setting information.

2. The mobile terminal test apparatus according to claim 1, wherein
   the multiplexed signal is a signal in which the signals forming the multiplexed signal are time-division-multiplexed into a plurality of slots, and
   the test control unit
      displays, on the display unit, a part of setting information set in the pseudo base station unit for each of the slots, as the first setting information, and
      displays, on the display unit, setting information, other than the first setting information, set in the pseudo base station unit for each of the slots, as the second setting information.

3. The mobile terminal test apparatus according to claim 1, wherein
   when one of the signals forming the multiplexed signal is selected in a predetermined mode, which is different from the specific mode, by the operation unit, the test control unit displays, on the display unit, a setting change screen in which the second setting information set in the pseudo base station unit for the signal forming the multiplexed signal selected by the operation unit is adapted to be changed.

4. A mobile terminal test system comprising:

a mobile terminal test apparatus which tests a mobile terminal; and a test control apparatus which controls the mobile terminal test apparatus, wherein the mobile terminal test apparatus includes a pseudo base station unit that functions as a base station for the mobile terminal, the test control apparatus includes
- a test control unit that controls the pseudo base station unit,
- a display unit that displays setting information in the pseudo base station unit, and
- an operation unit, the pseudo base station unit transmits and receives a multiplexed signal to and from the mobile terminal, and the test control unit
- displays, on the display unit, a part of setting information set in the pseudo base station unit for each of signals forming the multiplexed signal, as first setting information, and
- when one of the signals forming the multiplexed signal is selected in a specific mode by the operation unit, displays, on the display unit, setting information, other than the first setting information, set in the pseudo base station unit for the signal forming the multiplexed signal selected by the operation unit, as second setting information such that the second setting information is superimposed on the first setting information.

5. A control method for a mobile terminal test apparatus which includes a pseudo base station unit that functions as a base station for a mobile terminal, a test control unit that controls the pseudo base station unit, a display unit that displays setting information in the pseudo base station unit, and an operation unit, the pseudo base station unit transmitting and receiving a multiplexed signal to and from the mobile terminal, the control method comprising: causing the test control unit to execute:

a first display step of displaying, on the display unit, a part of setting information set in the pseudo base station unit for each of signals forming the multiplexed signal, as first setting information; and a second display step of, when one of the signals forming the multiplexed signal is selected in a specific mode by the operation unit, displaying, on the display unit, setting information, other than the first setting information, set in the pseudo base station unit for the signal forming the multiplexed signal selected by the operation unit, as second setting information such that the second setting information is superimposed on the first setting information.

6. The control method for a mobile terminal test apparatus according to claim 5, wherein the multiplexed signal is a signal in which the signals forming the multiplexed signal are time-division-multiplexed into a plurality of slots, and in the first display step, a part of setting information set in the pseudo base station unit for each of the slots is displayed as the first setting information, on the display unit, and in the second display step, setting information, other than the first setting information, set in the pseudo base station unit for each of the slots is displayed as the second setting information, on the display unit.

7. The control method for a mobile terminal test apparatus according to claim 5, wherein when one of the signals forming the multiplexed signal is selected in a predetermined mode, which is different from the specific mode, by the operation unit, the test control unit executes a step of displaying, on the display unit, a setting change screen in which the second setting information set in the pseudo base station unit for the signal forming the multiplexed signal selected by the operation unit is adapted to be changed.

* * * * *